I
US007566467B2

(12) United States Patent
Froseth et al.

(10) Patent No.: US 7,566,467 B2
(45) Date of Patent: *Jul. 28, 2009

(54) INULIN INFUSED VEGETABLE AND METHOD OF PREPARATION

(75) Inventors: Barrie R. Froseth, Plymouth, MN (US); Sean W. Creedon, Tewksbury, MA (US)

(73) Assignee: General Mills, Inc., Minneapolis, MN (US)

( * ) Notice: Subject to any disclaimer, the term of this patent is extended or adjusted under 35 U.S.C. 154(b) by 515 days.

This patent is subject to a terminal disclaimer.

(21) Appl. No.: 11/410,534

(22) Filed: Apr. 25, 2006

(65) Prior Publication Data

US 2006/0216393 A1 Sep. 28, 2006

Related U.S. Application Data

(63) Continuation of application No. 10/666,320, filed on Sep. 18, 2003, now Pat. No. 7,118,772.

(51) Int. Cl.
*A23L 1/212* (2006.01)
(52) U.S. Cl. .................. 426/74; 426/615; 426/620; 426/639; 426/640; 426/658
(58) Field of Classification Search .................. 426/74, 426/620, 615, 640, 639, 658
See application file for complete search history.

(56) References Cited

U.S. PATENT DOCUMENTS

| 4,361,589 | A | 11/1982 | Wauters et al. |
| 4,364,968 | A | 12/1982 | Waitman et al. |
| 4,517,210 | A | 5/1985 | Fogel |
| 4,542,033 | A | 9/1985 | Agarwala |
| 4,551,348 | A | 11/1985 | O'Mahony et al. |
| 4,626,434 | A | 12/1986 | O'Mahony et al. |
| 4,713,252 | A | 12/1987 | Ismail |
| 4,775,545 | A | 10/1988 | Augustine et al. |
| 5,000,972 | A | 3/1991 | Nafisi-Movaghar |
| 5,073,400 | A | 12/1991 | Bruno et al. |
| 5,362,503 | A | 11/1994 | Burri et al. |
| 5,364,643 | A | 11/1994 | Morimoto et al. |
| 5,439,692 | A | 8/1995 | Guzman et al. |
| 5,518,740 | A | 5/1996 | Costanzo et al. |
| 5,527,556 | A | 6/1996 | Frippiat et al. |
| 6,159,527 | A | 12/2000 | Wettlaufer |
| 6,303,778 | B1 | 10/2001 | Smits et al. |
| 6,399,142 | B1 | 6/2002 | Silver |
| 6,403,134 | B1 | 6/2002 | Nayyar et al. |
| 6,436,453 | B1 | 8/2002 | van Lengerich et al. |
| 6,780,445 | B1 | 8/2004 | Rhodes |
| 6,800,307 | B1 | 10/2004 | Matthews et al. |
| 6,811,803 | B2 | 11/2004 | Carre |
| 7,118,772 | B2 * | 10/2006 | Froseth et al. ............... 426/74 |
| 2004/0161522 | A1 | 8/2004 | Toves |
| 2004/0213886 | A1 | 10/2004 | Toves |
| 2004/0219157 | A1 | 11/2004 | Rochat et al. |
| 2005/0064067 | A1 | 3/2005 | Schmitt |
| 2005/0064082 | A1 | 3/2005 | Froseth et al. |
| 2005/0079244 | A1 | 4/2005 | Giffard et al. |
| 2005/0084565 | A1 | 4/2005 | Gutknecht et al. |
| 2005/0112239 | A1 | 5/2005 | Rudin et al. |
| 2005/0129825 | A1 | 6/2005 | Gray et al. |
| 2005/0153018 | A1 | 7/2005 | Ubbink et al. |
| 2005/0233049 | A1 | 10/2005 | Gutknecht et al. |

FOREIGN PATENT DOCUMENTS

WO WO 00/56178 9/2000

* cited by examiner

*Primary Examiner*—Helen F Pratt
(74) *Attorney, Agent, or Firm*—John A. O'Toole; Doug J. Taylor; Everett Diederiks

(57) ABSTRACT

Dried foods infused with inulin are provided, especially whole vegetable pieces. Such products are characterized as food pieces having a water activity ranging from about 0.15 to 0.5. The foods can comprise about 1% to 30% inulin. The inulin has a D.P ranging from about 2-9. The products are shelf stable and provide high levels of fiber. Methods of preparing dried inulin infused vegetable products are described comprising the steps of providing a quantity of un-comminuted food pieces having a moisture content ranging from about 40% to about 95%; infusing the food pieces with an inulin wherein the inulin has a degree of polymerization ranging from about 2-9 to form an at least partially inulin infused food piece; and drying the inulin infused food piece to a finish water activity ranging from about 0.4 to 0.55.

22 Claims, No Drawings

INULIN INFUSED VEGETABLE AND METHOD OF PREPARATION

CROSS-REFERENCE TO RELATED APPLICATIONS

This application represents a continuation of U.S. patent application Ser. No. 10/666,320, filed Sep. 18, 2003, now U.S. Pat. No. 7,118,772.

BACKGROUND OF THE INVENTION

The present invention relates to food products and to methods of their preparation. More particularly, the present invention relates to dried foods infused with inulin especially vegetables and to their methods of preparation.

The present invention provides further improvements into dried infused foods especially vegetables.

Drying wet foods such as fruits vegetables and meats for preservation has been practiced from ancient times. In modem technical terms, such products are dried to water activity values ("$A_w$") such s below 0.5 in order to provide dried fruits that are shelf stable at room temperatures. Dried fruits are commonly added to dry packaged food products such as dry mixes for layer cakes, muffins or pancakes, to trail mixes comprising mixtures of nuts, cereal pieces, to granola or cereal bars, and especially to Ready-To-Eat ("RTE") cereal products such as corn or wheat flakes. Bran flakes with raisins are well known.

However, such packaged food products are typically dry products having very low water activity values. RTE cereals, for example, often have water activity values of 0.2 or lower. It is a well known problem that moisture equilibration over time in dry packaged food products with added dried fruits dried to only a 0.5 water activity level can involve moisture transfer from the less dry fruit to the more dry food products. This moisture migration tends to further dry and thereby toughen the fruit, even those that are sugar infused. Also, the moisture increase in the packaged food can lead to its loss of freshness or crispness. In severe case, mold or other decay can occur.

To overcome such moisture migration problems, dried fruits can be dried more to equivalent moisture activity values. However, drying fruits to very low water levels indicated by low water activity values, e.g., below 0.3, to avoid moisture equilibration with dried cereal generally result in such dried fruits being extremely tough and leathery and thus difficult to consume.

In another approach to drying to low water activity values and/or to moderate the problems of fruit moisture loss and food product moisture gain, dried fruits have been infused with sugars and to provide sugar infused dried fruits.

Of coarse, infusing sugars such as honey into fruits, e.g., dates, prior to drying has been practiced from ancient times to lower the water activity while providing dried fruit products that are softer in texture. More recently, refined sugars such as sucrose, fructose and dextrose or corn syrups have been used to infuse dried fruits. (See, for example, U.S. Pat. No. 4,542,033 "Sugar and Acid Infused Fruit Products and Processes Therefor" issued Sep. 17, 1985 to Agarwala)

In variations dried infused fruit products has often involved fortifying the infusion solution with a humectant such as a polyhydric alcohol, usually glycerol, to improve the texture properties of such infused dried fruits.

While sugar and/or glycerin infused dried fruit products are well known and commonly added to dried food products such as RTE cereals, such products are not without longstanding problems. For example, some consumers find such sugar infused fruits excessively sweet. Also, many consumers are sensitive to the taste of glycerol and complain of bitterness at higher glycerin levels.

Infusion methods generally involve steeping the fruit in concentrated infusion solutions over time often at elevated or boiling conditions and thereafter drying the infused fruits. Much effort has been directed at decreasing the infusion or drying times, minimizing the waste or degradation of the spent infusion solution, the overall complexity and cost of drying and infusion operations as well as improving the texture or eating qualities of the infused fruit.

While fresh and dried fruit products provide high levels of nutrition and consumers are often recommended to increase their consumption of fresh fruit, neither fresh fruits nor dried fruits are excellent sources of fiber.

Thus, there is a continuing need for new and improved infused dried food products especially fruit that can be dried to water activity levels compatible with dry packaged food items that are not excessively tough, sweet nor burdened with the taste of conventional humectants as well as their methods of preparation.

Thus, there is a continuing need for new and improved products that provide high levels of nutritionally desirable fiber and that provide desirable eating qualities.

Surprisingly, the present invention provides improvements in the provision of infused dried food products such as fruits by selecting inulin of a particular molecular weight, an oligosacharide, for infusion into fruits and drying to desired moisture levels. More surprisingly, such inulin infused dried food products are characterized by increased levels of fiber of a remarkable palatability. Such inulin infused dried fruits find particular suitability for use for addition to low water activity dry packaged food products such as RTE cereals. Also, methods for preparing such inulin infused dried fruit products are commercially practical and can employ commonly available apparatus and techniques.

More surprisingly, combining inulin infused dry fruit provides a convenient technique for increasing the fiber level of common food products that consumers expect to comprise dried fruits especially Ready-to-eat cereals.

Formulating ready to eat cereal products with inulin as well as topical application of inulin to a cereal coating is know (See, for example, U.S. Pat. No. 6,149,965 "Cereal Products With Inulin And Methods Of Preparation" issued Nov. 21, 2000 to Larson). However, such fortification is not without difficulties. Addition of inulin to a cooked cereal dough from which dried ready-to-eat cereal products are fabricated can result in a cereal dough that is sticky and difficult to process in commercial cereal product manufacturing. Topical addition of inulin to RTE cereal products can result is a coated cereal that is hygroscopic. Surprisingly, providing inulin infused dried fruit provides a convenient technique for providing high levels of fiber in an RTE cereal that minimizes the dough handling and hygroscopic problems of inulin addition to RTE cereals. The properties of the non or limited inulin bearing cereal base can remain unchanged. Also, by adding the inulin as part of a blended component to cereal base rather than in the cereal base, the manufacturing problems associated with handling a high inulin level cooked cereal dough can be minimized.

BRIEF SUMMARY OF THE INVENTION

In its product aspect, the present invention resides dried foods infused with inulin. Such products are characterized as food pieces having a water activity ranging from about 0.15 to 0.75. The foods can comprise about 1% to 30% inulin. The inulin has a D.P ranging from about 2-9.

In its method aspect, the present invention is directed to methods of preparing dried inulin infused vegetable products. The process comprises the steps of:

providing a quantity of uncommunited food pieces having a moisture content ranging from about 40% to about 95%;

infusing the food pieces with an inulin wherein the inulin has a degree of polymerization ranging from about 2-9 to form an at least partially inulin infused food piece; and drying the inulin infused food piece to a finish water activity ranging from about 0.4 to 0.55.

DETAILED DESCRIPTION OF THE INVENTION

The present invention relates to dried food product infused with inulin characterized by high inulin levels and to methods of their preparation and use. Each of the product components as well as product use and attributes and methods of their preparation are described in detail below.

Throughout the specification and claims, percentagages are by weight and temperatures in degrees Centigrade unless otherwise indicated. Each of the referenced patents and applications are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The present invention provides dried food products infused with inulin or other non-digestible short chain carbohydrates with a low molecular weight and a high water-binding capacity. The dried products are characterized by a water activity value ranging from about 0.15 to 0.75, preferably about 0.4 to about 0.55, in certain embodiments more preferably about 0.45 to about 0.55.

The dried food products can be selected from the group consisting of fruits, garden vegetables, meats, and mixtures thereof. The present invention finds particularly suitability for use in the provision of dried fruit products especially dried whole fruit pieces or slices of whole pieces. While any fruit can be employed, conveniently the fruit pieces can be of apple, apricots, avocado, banana, blueberries, cherries, cranberries, dates, kiwi, mango, pineapple, raisins, raspberries, strawberries, tomatoes, and mixtures thereof. Preferred for use herein are fruit selected from the group consisting of apple, blueberries, cherries, cranberries, raisins, raspberries, strawberries, and mixtures thereof. Preferred whole fruit pieces include apples, blueberries, cherries, raisins, cranberries raspberries, and mixtures thereof. In other variations, infused dried blends of fruits and vegetables, such as of tomato's or onion or peppers or mixtures can be used to provide fiber to those products typically characterized by low fiber levels, e.g., frozen pizza, or picante sauce (seasoned tomato/onion/sweet pepper sauce) or meat or sauce filled products, e.g., pocket sandwiches, pizza rolls, ravioli, tortellini, etc.

Common garden vegetables include, for example, beans (green, waxy-yellow, fava, chick pea, red, dark red, pinto, etc.), beets, carrots, cucumber, sweet corn, celery, onion, mushroom, peppers (whether sweet or bell peppers or hot or chili peppers), peas, potatoes, squash and mixtures thereof.

Suitable meats include common domestic food animals including beef, bison, chicken, duck, goose, lamb, pork, rabbit, as well as various common or exotic game meats including bear, deer, elk, pheasant, wild foul, moose and the like. The present invention finds particular suitability for use in connection with brine or cured meat products such as corned beef or ham. Fish pieces and fish fillets are also contemplated herein especially shrimp.

While in the balance of the present description particular attention is paid to dried infused fruit products, the skilled artisan will appreciate that the invention is suitable for use in the provision of dried infused food products using garden vegetable or meat products. In the preferred embodiment, the present infused fruit pieces are characterized in part by retention of their native structure at least in part, i.e., are uncomminuted. Thus, the present dried whole fruit or piece fruit products are to be distinguished in the preferred embodiment from fabricated food pieces prepared from fruit purees or juices that included added materials including structuring agents and regardless of the shape of form of such fabricated fruit pieces. Likewise, the vegetable or meat products are in the form of individual pieces, e.g., whole peas or even whole pea pods, corn although pieces, e.g., beet slices or cubed carrots, are also contemplated. In less preferred embodiments, dried pieces fabricated from comminuted meats, e.g., sausage or vegetables, e.g., refried beans can be prepared by simple admixture with powdered inulin or inulin in solution form followed by dehydration and piece forming (or reversed).

The dried food products are also characterized by inulin levels ranging from about 1% to about 45%, preferably about 15% to 40% and for best results about 20% to 35%. The inulin levels include both native and infused or added inulin. However, as a practical matter, substantially all the measurable inulin in a particular infused dried fruit piece of common fruits will be the result of infusion.

Inulin is major constituent of some of the most famous of the "old-standby" herbs, such as burdock root, dandelion root, elecampane root, chicory root (*Cichorium intybus*), and the Chinese herb codonopsis. Botanically, inulin is a storage food in the plants of the Composite family. The term "inulin" can be used to describe a wide variety of food ingredients most commonly derived from Chicory or Jerusalem artichokes. Inulin regardless of source can also be defined in part by molecular weight typically characterized in terms of degree of polymerization. Generally, inulin is extracted from plant sources high in inulin levels typically by hot water extraction. Inulin is composed of linear chains of fructose molecules varying in length from 2-60 units. These chains are connected by beta (2-1) linkages and are often terminated by a glucose unit. Due to these linkages, inulin is not digested and therefore possesses a number of unique nutritional properties. Inulin is one of few known soluble dietary fibers materials. Besides being a beneficial dietary fiber, inulin is considered a probiotic because it stimulates beneficial bifidobacteria in humans.

Useful herein as the inulin ingredient for infusion is that relatively low molecular weight inulin material characterized by a degree of polymerization ("DP") value ranging less than or about 9 (i.e., "DP") </=9"). Such materials include oligofructose, a subgroup of inulin. Among all inulin materials, such low molecular weight inulin materials are selected herein due to their relative osmotic superiority compared to otherwise similar but to higher molecular weight inulin materials. Due to their osmotic superiority, higher levels of inulin can be infused. Also such inulin ingredients are prepared by isolation of such low DP constituents from blends of higher and lower inulin or by partial enzymatic hydrolysis. When provided by partial enzymatic hydrolysis the resulting material is sometimes referred to as Oligofructose. Oligofructose typically has a DP ranging from about 2-7. Such materials are commercially available such as is available from Orafti Active Food Ingredients under the trade name of RAFTILOSE. The inulin can be supplied in the form of a liquid solution comprising about 50-95% oligofructose (dry weight basis), and the balance sugars glucose, fructose and sucrose in varying combinations. In other preferred embodiments, the inulin can have a DP ranging from about 5-9.

While in the preferred embodiment, the present dried fruit products are infused with inulin, especially oligofructse, inulin ingredient can be substituted in whole or in part with other non-digestible short chain carbohydrates with a low molecular weight and a high water-binding capacity. The ingredient are useful in producing "infused" fruits which have a reduced Aw, enhanced eating characteristics (moistness) and greatly elevated levels of soluble fiber. By low molecular weigh is meant having a molecular weight ranging from about 8 to 800. By non digestible is meant that less than 10% of the material is typically metabolized.

The inulin infused dried fruit products can additionally comprise about 1% to about 40% by weight of a liquid humectant such as glycerin, propylene glycol and mixtures thereof. Glycerin infused dried fruits are beneficially characterized by a softer eating texture. However, infusion of glycerin can result in lower levels of inulin and in the dried infused fruit products.

In less preferred variations, the dried infused fruit products can comprise about 1% of about 15% of low molecular weight or common sugars such as sucrose, fructose, glucose and alike. Likewise, infusion with such low molecular weight common sugars provide certain cost advantages since such is common simple sugars are much less expensive than inulin. However, such sugars infused dried fruit products will tend to have lower levels of inulin.

In certain preferred embodiments, the dried fruit products are infused with inulin alone. In other embodiments, the weight ratio of infused inulin to glycerin ranges from about 1:1 to about 3:1, preferably about 2:1. Such inulin-to-glycerin ratios provided balance between the fiber benefits of inulin balanced with the eating qualities and texture of glycerin.

The dried products of the present invention will have levels of salt due to their native salt content. In preferred embodiments, especially for dried infused fruit products, the infusion solution is free of added salt (sodium chloride and/or potassium chloride). However, for some dried infused food products, e.g., infused, dried meat products, for brine cured products or for vegetable products, the infusion solution can additionally comprise 0.1% to 25%, preferably 1%-8% salt. The salt can be added for flavor or to reduce costs or to reduce the extent of post infusion drying required to provide finished dried products of desired water activity levels. However, the skilled artisan will recognize that salt addition to the infusion solution can result in some diminution of the added fiber content of the fished dried product by reducing the inulin concentration in the infusion solution.

The infusion solution can additionally comprise a variety of minor adjuvant materials to improve the appearance, taste or nutritional properties of the finished dried infused products herein. These adjuvant materials can include vitamin and/or mineral fortification, colors, flavors, high potency sweetener (s), preservatives and mixtures thereof. The precise ingredient concentration in the present dried composition will vary in known manner. Generally, however, such materials can each comprise about 0.01% to about 2% dry weight of the finished dried infused product. One especially useful material is an acidulant such as an edible organic acid such as citric, tartaric, malic and mixtures thereof. High potency sweeteners, especially sucralose and potassium acetylsulfame and mixtures thereof, can be added.

In preferred embodiments, especially those prepared from comminuted purees are preferably low in added grain or cereal ingredients such as flours or cereal grain starch derived ingredients such as corn starch. By low herein is meant less than 5% (dry weight basis) and preferably less than 1%.

The inulin infused dried fruit products of the present invention are useful foods per se and provide high levels of fiber provided by the inulin in addition to the other nutritional qualities of dried fruit. The dried fruit products can be used as snack food products.

Also, while the present invention is directed in particular to un comminuted or whole fruit or vegetable pieces, the skilled artisan will appreciate that dried fruit pieces fabricated from a fruit pulp or puree formulated with equivalent levels of inulin can also be prepared and usefully added as particulates. If desired, meat products such as sausages can also be prepared. In still other variations, fabricated seafood pieces can be fabricated from comminuted fish flesh or surimi.

In addition, these infused fruits will have a relatively reduced caloric due to their high inulin content and reduced sugar concentration.

Also, the present inulin infused dried fruit products find suitability for use as an ingredient in a wide variety of composite food products. Such composite food products can be in solid, plastic or semisolid form. In solid form, the products can be in particulate form or in the form of a mass. For example, the present infused dried fruit products find particular suitability for use for inclusion as a functional food ingredient in ready to eat cereals. Such ready to eat cereals are food products in particulate solid form especially in is in the form of flakes, puffs, shreds, biscuits and mixtures thereof. The cereal base or portion can be a conventional cereal base piece with or without added inulin fortification or the cereal base piece itself. Since inulin fortification to cereal base pieces can impair either finished product eating qualities or the ease or processing or making of such pieces, it is an advantage of the present invention that regular or unaltered or unfortified cereal base pieces can be employed with their desirable eating characteristics with the desired level of inulin fortification being provided by or at least in part by the present inulin infused dried fruit particulates.

Such composite food products can also be in the form of a mass, e.g., a cereal bar. The dried fruit pieces can be admixed with the cereal and formed into a bar such as with a binder. In other variations, the bars can include a separate layer or region including the fruit pieces. The dried infused fruit pieces can be admixed, if desired with an unfortified or inulin bearing fruit paste or puree. Good results are obtained when the dried infused food product comprises about 1% to about 40%, preferably about 15% to about 35% of the ready to eat cereal while the cereal particulates or cereal base comprises about 60% to about 99% of the product. Other typical ready to eat cereal ingredients such as nut pieces, dried marshmallow pieces can be additionally admixed with the blend of the present inulin infused dried fruit products and ready to eat cereal base.

In particular, the present infused dried fruit products can be admixed with a ready-to-eat cereal base to provide a blended product that provides high levels of fiber due to the inulin ingredient in the dried infused fruit. The cereal base can be unfortified with inulin or can itself contain additional inulin to supplement that provided by the inulin infused fruit. Since consumers are already familiar with ready-to-eat cereals containing dried fruits, the present resulting blended fruit and cereal products will be familiar to consumers notwithstanding their higher levels of inulin. In certain embodiments, the cereal base will not be fortified with inulin and the cereal base can provide its familiar organoleptic properties. Also, no special cereal manufacturing is needed to prepare the base. In other variations, the cereal base can include modest levels of inulin fortification such as by topical application of inulin in a coating such as a sugar coating.

In other variations, the present inulin infused dried fruit products in piece form can be added to a variety of other shelf stable food products such as dry mixes for baked goods, snack or trail mixes (of pretzels, nuts, cereal pieces, dried meats pieces, and mixtures thereof. For inulin infused vegetables, the dried pieces can be added to a variety of dried or shelf stable dry mixes to provide finished cooked products with higher fiber levels. For example, dried inulin infused vegetables can be added to dry mixes for soups or to add-meat dinner dry mixes.

The present infused dried fruit products also find suitability for use for inclusion into a wide variety of dairy products both refrigerated and frozen. For example, the present infused dried fruit products can be added to the yogurt to provide products that not only provide the nutrition and taste appeal of fruit but also provide high levels of fiber without the adverse impacts on yogurt flavor and extension of yogurt fermentation times from the addition of fiber sources to the yogurt base. Also, the present inulin infused dried fruit products can be added to a variety of aerated frozen dairy products such as ice cream or soft serve frozen dairy products. The presence inulin infused dried fruit products can be added to other nondairy frozen especially aerated frozen desserts such as sorbets. Good results are obtained when the added dried fruit comprises about 1% to about 35%, preferably about 10% to 30% of the dairy products.

Method of Preparation

The present invention further provides methods for preparing such inulin infused dried food products. The methods comprise the steps providing a quantity of uncommunited food pieces having a moisture content; infusing the food pieces with an inulin wherein the inulin has a degree of polymerization ranging from about 2-9 to form an at least partially inulin infused food piece; and, in the preferred form, drying the inulin infused food pieces to a finish water activity ranging from about 0.4 to 0.75 to provide a dried inulin bearing food pieces In the preferred embodiment, in the first step the starting food product is in the form of discreet pieces, i.e., non comminuted to form a puree. The starting food product will have an initial moisture content and water activity value. Typically, in the preferred embodiment, fresh or frozen fruit will have a moisture content of about 90 to 95% and water activity value of 0.95. Frozen fruit can be used after thawing. In another variation, dried fruit can be used as a starting material such as raisins. Such a dried ahead fruit product starting material's can have a initial water activity as well as 0.40. When a dried fruit is used as the staring material, then the finish drying step can be reduced or, ideally, eliminated. In less preferred embodiments, previously dried fruit can be rehydrated in whole or in part to moisture contents typical all of fresh fruit. However, since the rehydrated infused fruit typically will require further dehydration after infusion, rehydration of dried fruit is undesirable.

The food pieces can be of any convenient size and shape. Good results are obtained with whole fruit pieces such as cherries, raisins, strawberries, blueberries, cranberries and mixtures thereof. Conveniently, other food products to the infused such as common garden variety vegetables or meat pieces can be likewise sized. Larger fruits or vegetables, e.g., carrots, can be sized into convenient size and shaped pieces.

The present infusion step can be conveniently practiced by treating a quantity of food pieces with a liquid inulin infusion solution. Thus, this infusion step can include one or more sub-steps. For example, this step can include a sub-step of providing an inulin bearing liquid infusion solution. The infusion step can include a sub-step of admixing a the un-comminuted with the liquid inulin infusion solution; heating the solution and food pieces for microbial control; and holding the pieces and the solution until most of the inulin has been infused; separating the infused food pieces from the solution before drying to provide a dried infused food product.

Inulin can be obtained as an ingredient in dry or, more conveniently, in solution form. The liquid inulin ingredient can then be admixed with desired amounts of glycerin and moisture to provide a clear inulin containing infusion solution. If all or a portion of the inulin is provided in dried form, the dry ingredients can be dissolved in water and heated for time sufficient to provide a clear solution in which the solids are completely dissolved. If desired, the infusion solution can be a pH adjusted by addition of sufficient amounts of suitable edible organic acids to lower the pH to desired levels. If desired, the solution can also be adjusted in pH upwards by addition of edible alkaline ingredients such as sodium bicarbonate.

Good results are obtained when the infusion solution comprises:

| Ingredient | Weight % | Preferred Weight % |
|---|---|---|
| Inulin | 60%-90% | 65 to 85 |
| Glycerin | 0 percent to 30 percent | 5% to 25% |
| Water | 1 percent-20 percent | 5-10% |

In variations, the inulin bearing infusion solution can additionally comprise low molecular weight nutritive carbohydrate sweeteners including conventional sugars such as sucrose, fructose, dextrose, maltose, honey and mixtures thereof. Such sugar added infusion solutions are less preferred since the finished inulin infused dried fruit products will be characterized by lower levels or concentrations of inulin in the dried finished product. Such lower concentrations of inulin are due in part to the dilution effect of such sugars. However, in those variations wherein lower levels of fiber are acceptable, especially for low cost products, the infusion solution can additionally include about 0.1% to about 30% of such nutritive carbohydrate sweeteners. In those variations, the dried finished fruits will comprise about 1% to 40% added sweeteners.

Thereafter, the starting food pieces especially fruit pieces are then combined with the inulin bearing infusion solution in any convenient manner. The weight ratio of infusion solution to food pieces can range from about 1:1 to about 20:1, preferably about 1.5: to 34:1 and for best results about 2:1. Preferably, sufficient amounts of infusion solution is combined were admixed with the food pieces to completely cover the food pieces with the infusion solution. In other variations, a substantial excess of infusion solution is provided in the form of a bath in which the food pieces especially fruit pieces are immersed.

Continuous, batch, or semi batch operations are contemplated herein. Also, the skilled artisan will appreciate that variations of the treatment process such as by recirculation of the spent infusion solution or continuous resupply of the infusion solution can be practiced for processing efficiencies.

Thereafter, the present methods can include treating the admixture of infusion solution and food pieces for microbial control. Conveniently, the infusion and food piece admixture can be heated to appropriate temperatures for microbial control. Good results, for example are obtained when the admixture is heated to a temperature of above about 70° C. (>175° F.). In other variations, addition of anti microbial ingredients can be the microbial treatment technique.

The present methods include holding the infusion solution and food piece admixture or blend or allowing to stand to allow for infusion of the infusion solution ingredients into the food piece to provide an infused food or fruit piece and a spent infusion solution. The holding time does not need to be so long as to reach complete osmotic equilibrium but should be practiced to allow for at least partial infusion of the infusion solution into the food product. Of course, as the admixture is held, osmotic pressure will drive towards equilibration over time. Inulin being higher in concentration in the infusion solution will tend to infuse into the food pieces by osmotic pressure. Likewise, glycerin, if present in the infusion solution, will be infused into the food pieces. Sugars and moisture initially present in the food pieces will likewise equilibrate by osmotic pressure. For fresh fruits characterized by a higher initial moisture levels, moisture will be picked up by the infusion solution as well as some native sugars.

The admixture can be maintained at elevated temperatures or heating can be discontinued and the admixture can be allowed to cool to ambient temperatures. Maintaining higher temperatures tends to accelerate reaching osmotic equilibrium and will increase the rate of infusion and decrease the duration of require holding periods. Treatment times are not critical but good results are obtained for treatment or holding times ranging from about three to 24 hours depending in part upon such factors as batch temperature, ratio of infusion solution to food pieces, initial moisture content of the food pieces, and desired levels of infused inulin in the finished products.

Thereafter, the inulin infused fruit products so prepared can then separated from the spent infusion solution. It will be appreciated that the infusion step results in at least some drying of the stating material by osmotic drying. Conveniently, the infused fruit pieces can be washed and allowed to drain to remove any residual topical infusion solution or otherwise be cleaned of excess infusion solution (e.g., spinning or centrifuging, air sprayed).

The present methods can additionally comprise a step of drying the infused food products to desired finished moisture content and water activity values ranging from about 0.15 to 0.75. Good results are obtained when the finished water activity ranges from about 0.4 to about 0.55. In other embodiments, especially in the provision of dried infused fruit products suitable for addition to very dry blended products such as ready-to-eat cereal blends or dry mixes for baked goods, the drying step can be practiced to provide finished dried products herein having a water activity ranging from about 0.2 to 0.45. Fruit drying techniques are well known and any conventional technique can be used to practiced the drying step. For example, the drying step can be practiced employing thermal drying techniques including forced hot air, hot air, microwave and/or vacuum or freeze drying. Of course, combinations of these drying techniques are contemplated when one or more technique is used to practice partial dehydration. In one preferred embodiment, all or at least a portion of the drying step is practiced using vacuum drying. Such vacuum drying is practiced at low temperatures thereby assisting in the provision of a high quality finished product by reducing the exposure to higher temperatures.

In the preferred embodiment wherein fresh fruit pieces, e.g., blueberries, are the starting food piece material, good results are obtained when the drying step is practiced using hot air drying practiced at a temperature of about 40° C. for about eight to 12 hours. For highest quality dried fruit products, vacuum drying is the preferred drying technique since exposure to elevated temperatures is reduce. Such vacuum drying can be used for high quality or high cost fruits such as fresh blueberries, sliced strawberries or other whole fruit pieces especially raspberry, blueberries, blackberries and mixtures thereof.

The spent infusion solution can be reclaimed or recaptured and used to prepare additional batches or quantities of infusion solution. The infusion solution can be further dried or pure materials added thereto. In other variations, a portion of the spent infusion solution is added back into the make-up of a fresh batch or quantity of infusion solution.

In certain embodiments, the present methods can additionally comprise the step of admixing a quantity of the dried inulin bearing pieces so prepared with a quantity of a second food component to form a blend. In preferred form, the second food component is in dry and in a particulate form such as ready-to-eat cereal pieces or other dry mix ingredients. In a particular embodiment, the second food component is a ready-to-eat cereal having a water activity of about 0.1 to 0.3.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dried infused vegetable food product, comprising:
   a food body including, at least in part, a vegetable component;
   a vegetable infused inulin content ranging from about 1% to about 35% wherein the inulin has a degree of polymerization ranging from about 2-9;
   a moisture content ranging from about 5% to about 25%; and,
   an $A_w$ ranging from about 0.25 to 0.75.

2. The food product of claim 1 wherein at least a portion of the inulin is oligofructose.

3. The food product of claim 2 additionally comprising about 1% to 30% infused humectant selected from the group consisting of glycerin, poly glycerol ester, and mixtures thereof.

4. The food product of claim 3 wherein the starch content is less than 5%.

5. The food product of claim 4 wherein the inulin has a degree of polymerization ranging from about 5 to 9.

6. The food product of claim 1 wherein the food product has an $A_w$ ranging from about 0.4 to 0.55.

7. The food product of claim 6 in admixture with a second food.

8. A method for preparing an infused food piece, comprising the steps of:
   providing a quantity of un-comminuted food pieces having a moisture content ranging from about 40% to about 95%, wherein at least a portion of the food pieces is a vegetable;
   infusing the food pieces with an inulin wherein the inulin has a degree of polymerization ranging from about 2-9 to form an at least partially inulin infused food pieces.

9. The method of claim 8 wherein the infusing step is practiced with an inulin containing syrup.

10. The method of claim 9 wherein the weight ratio of inulin containing syrup to food pieces ranges from about 20:1 to about 1:1.

11. The method of claim 10 wherein the infusing step includes admixing the inulin containing syrup with the food pieces to form a mixture of food pieces and the inulin containing syrup.

12. The method of claim 11 wherein the infusing step includes the sub-step of holding the mixture of inulin containing syrup and food pieces for sufficient time to allow osmotic equilibrium to form the inulin infused food product and a spent inulin syrup.

13. The method of claim 12 additionally comprising the step of separating the inulin infused food product from the spent inulin syrup.

14. The method of claim 11 additionally comprising the step of drying the inulin infused food pieces to a finish water activity ranging from about 0.15 to 0.75 to provide dried inulin bearing food pieces.

15. The method of claim 14 wherein at least a portion of the drying step is practiced using vacuum drying.

16. The method of claim 14 wherein at least a portion of the drying step is practiced by osmotic drying.

17. The method of claim 14 wherein the infusing step includes a sub-step of treating the mixture for microbial control.

18. The method of claim 17 wherein the infusing step includes the sub-step of holding the mixture of inulin containing syrup and food pieces for sufficient time to allow osmotic equilibrium.

19. The method of claim 18 wherein the microbial control treating step comprises heating the mixture to a temperature of $\geqq 40°$ C.

20. The method of claim 19 wherein the inulin syrup comprises
   (1) fructo oligo sacharides at a concentration of about 30% to 100% (dry weight basis) of the syrup,
   (2) about 1% to 50% glycerin; and
   (3) about 10% to 20% moisture.

21. The method of claim 10 wherein at least a portion of the inulin is oligofructose.

22. The method of claim 21 wherein the infusing step is performed with an infusion solution that includes salt.

* * * * *